(12) United States Patent
Skinner et al.

(10) Patent No.: US 7,120,821 B1
(45) Date of Patent: Oct. 10, 2006

(54) METHOD TO REVIVE AND RECONSTITUTE MAJORITY NODE SET CLUSTERS

(75) Inventors: Steven George Skinner, Trabuco Canyon, CA (US); Matthew Ky Phuong, Rosemead, CA (US); Mark Lynn Preston, Lake Forest, CA (US)

(73) Assignee: Unisys Corporation, Blue Bell, PA (US)

( * ) Notice: Subject to any disclaimer, the term of this patent is extended or adjusted under 35 U.S.C. 154(b) by 537 days.

(21) Appl. No.: 10/626,325

(22) Filed: Jul. 24, 2003

(51) Int. Cl.
*G06F 11/00* (2006.01)

(52) U.S. Cl. .......................................... 714/4; 714/5

(58) Field of Classification Search .................... None
See application file for complete search history.

(56) References Cited

U.S. PATENT DOCUMENTS

| 5,790,772 | A | * | 8/1998 | Badovinatz et al. ........... 714/4 |
| 5,805,786 | A | * | 9/1998 | Badovinatz et al. ........... 714/4 |
| 5,887,127 | A | * | 3/1999 | Saito et al. .................... 714/4 |
| 5,991,524 | A |   | 11/1999 | Belkhale et al. |
| 6,108,699 | A | * | 8/2000 | Moiin ........................ 709/221 |
| 6,115,830 | A |   | 9/2000 | Zabarsky et al. |
| 6,163,855 | A |   | 12/2000 | Shrivastava et al. |
| 6,279,032 | B1 | * | 8/2001 | Short et al. .................. 709/209 |
| 6,336,171 | B1 |   | 1/2002 | Coskrey |
| 6,401,120 | B1 | * | 6/2002 | Gamache et al. ........... 709/226 |
| 6,402,120 | B1 |   | 6/2002 | Swaab |
| 6,453,426 | B1 | * | 9/2002 | Gamache et al. ............... 714/4 |
| 6,490,693 | B1 | * | 12/2002 | Briskey et al. ................ 714/15 |
| 6,542,929 | B1 | * | 4/2003 | Briskey et al. ............. 709/223 |
| 6,662,219 | B1 | * | 12/2003 | Nishanov et al. ........... 709/220 |
| 6,789,213 | B1 | * | 9/2004 | Kumar et al. .................. 714/13 |
| 6,938,084 | B1 | * | 8/2005 | Gamache et al. ........... 709/226 |
| 6,952,766 | B1 | * | 10/2005 | Dervin et al. ................... 713/2 |
| 2002/0161889 | A1 | * | 10/2002 | Gamache et al. ........... 709/226 |

OTHER PUBLICATIONS

Microsoft Corporation, Server Cluster: Quorum options, Microsoft Windows Server 2003, Mar. 2003.
Microsoft Corporation, Model 3: Majority node set server cluster configuration, 2003.
Microsoft Corporation, Server CLusters: Majority Node Sets (a.k.a. Quorum of Nodes), 2003.

* cited by examiner

*Primary Examiner*—Scott Baderman
*Assistant Examiner*—Joshua Lohn
(74) *Attorney, Agent, or Firm*—Alfred W. Kozak; Mark T. Starr; Lise A. Rode (57) ABSTRACT

The method of the present invention is useful in detecting the lack of majority cluster nodes within a cluster, and reorganizes the cluster membership to allow for running with less than a majority of nodes connected. As nodes become alive, they are added to the cluster until the original majority is reached, which then allows for the cluster to return to normal operation. Thus, the method of the present invention allows for the revival and reconstitution of a majority node set of clusters.

3 Claims, 6 Drawing Sheets

REVIVALPHASE

FIG. 1

FIG. 2A
REVIVAL PHASE

FIG. 2B
REVIVALPHASE

FIG. 3A
RECONSTITUTION PHASE

FIG. 3B
RECONSTITUTION PHASE

FIG. 4

METHOD TO REVIVE AND RECONSTITUTE MAJORITY NODE SET CLUSTERS

CROSS-REFERENCES TO RELATED CASES

This application is related to co-pending application U.S. Ser. No. 09/892,276 entitled "Failover Of A Simulated Operating System In A Clustered Computing Environment", which is incorporated herein by reference.

This application is related to co-pending application U.S. Ser. No. 09/935,863 entitled "Method For Diagnosing Hardware Configuration In a Clustered System", which is incorporated herein by reference.

This application is related to co-pending application U.S. Ser. No. 10/156,486 entitled "Secure Method For Ensuring Availability in a Clustered System", which is incorporated herein by reference.

This application is related to co-pending application U.S. Ser. No. 10/143,408 entitled "Method For Reducing Spurious Failovers In a Geographically Disbursed Clustered System", which is incorporated herein by reference.

BACKGROUND OF THE INVENTION

1. Field of the Invention

The present invention generally relates to utilizing underlying cluster systems to provide the functionality of reviving and reconstituting majority node set clusters. The methods of the present invention provide ways to have the cluster continue even if the number of nodes falls below what is designated as a majority. It then returns the cluster back to normal operation once the number of nodes available increases to the correct level, which has been designated in advance.

2. Description of Related Art

The present invention generally relates to utilizing underlying cluster systems to provide the functionality of reviving and reconstituting majority node set clusters. The methods of the present invention provide ways to have the cluster continue even if the number of nodes falls below what is designated as a majority. It then returns the cluster back to normal operation once the number of nodes available increases to the correct level, which has been designated in advance.

Today, in a traditional Microsoft Cluster Service (MSCS) cluster, a cluster can continue as long as one of the nodes owns the quorum disk. The Microsoft Cluster Service (MSCS) is software for the creation and management of a cluster. A cluster is a group of servers and other resources, in a computer system, that act like a single system and enable high availability and, in some cases, load balancing and parallel processing. Any nodes that can communicate (via heartbeats) with the quorum owner are part of the cluster and can host resources. Heartbeats in a cluster service are messages sent regularly by the Cluster Service on one node to the Cluster Service on another node across a private network connection. Any other nodes that are configured to be in the cluster, but cannot communicate with the quorum owner are said to have lost quorum and thus any resources that they are hosting, are terminated. A node is a computer system that is a member of a cluster. A traditional Microsoft Cluster Service (MSCS) cluster can continue as long as that node owns the quorum disk. A cluster running with a majority node set quorum resource will only start up or continue running if a majority of the nodes configured for the cluster are up and running and can all communicate with each other. The majority node set is a single quorum resource from an MSCS perspective. This majority node set resource takes care to ensure that the cluster configuration data stored on the majority node set is kept consistent across the different disks. The failure semantics of the cluster behaves on node failures and partitioned or split-brain scenarios, thus, care must be taken when deciding whether to choose a traditional MSCS cluster using a physical disk resource or cluster that uses a majority node set as a quorum resource.

There is a single quorum of nodes resource in the cluster and it is brought online on one node at any one time, just like any other cluster resource. A quorum is a disk resource used to store information about the current cluster configuration. The majority node set resource is responsible for ensuring that the quorum data is kept consistent on all disks around the cluster. When a cluster is setup to have a majority node set, a file share is created on that node. As described above, each node in a majority node set cluster has a file share that exports the quorum directory, so that, regardless of where the majority node set resource is hosted, it can write to all the members of the majority node set.

It is, therefore, necessary to devise a method to revive and reconstitute majority node set clusters after a node failure. Therefore, this invention provides a mechanism to bring the cluster back online, while looking at the rest of the cluster nodes, and bring them back in.

One related art method to which the method of the present invention generally relates is described in U.S. Pat. No. 6,115,830 entitled "Failure Recovery For Process Relationships In A Single System Image Environment". This prior art method is a system for recovery of process relationships following node failure within a computer cluster. For relationship recovery, each node maintains set of care relationships. Each relationship is of the form the carer cares about the care target. Care relationships describe process relations such as parent-child or group leader-group member. Care relationships are stored at the origin node of their care targets. Following node failure, a surrogate origin node is selected. The surviving nodes then cooperate to rebuild vproc structures and care relationships for the processes that originated at the failed node at the surrogate origin node. The surviving nodes then determine which of their own care targets were terminated by the node failure. For each of the terminated care targets, notifications are sent to the appropriate carers. This allows surviving processes to correctly recover from severed process relationships.

The present invention differs from the above related cited art in that the prior invention focuses on detecting the lack of a majority of nodes to be within the cluster and reorganizes the cluster membership to allow for running with less than a majority of nodes connected. In the instant invention, however, as nodes become alive, they are added to the cluster until the original majority is reached and then the invention allows the cluster to return to normal operation.

Yet another related art method to which the method of the present invention generally relates is described in U.S. Pat. No. 6,401,120 entitled "Method And System For Consistent Cluster Operational Data In A Server Cluster Using A Quorum Of Replicas". This prior art method is a method and system for increasing the availability of a server cluster while reducing its cost by requiring at a minimum only one node and a quorum replica set of storage devices (replica members) to form and continue operating as a cluster. A plurality of replica members maintain the cluster operational data and are independent from any given node. A cluster may be formed and continue to operate as long as one server node possesses a quorum (majority) of the replica members.

This ensures that a new or surviving cluster has at least one replica member that belonged to the immediately prior cluster and is thus correct with respect to the cluster operational data. Update sequence numbers and/or timestamps are used to determine the most updated replica member from among those in the quorum for reconciling the other replica members.

The present invention differs from this related art in that the cited related art deals with storing multiple copies of the quorum on external shared disks. Therefore, a cluster will be operational if at least one node is online and can access a majority of quorum copies. The difference here is that in the instant case, quorum data is stored locally on each nodes' internal drives. The present invention, however, relies on the underlying cluster service to maintain the data. This instant invention affects the cluster only when the number of member nodes falls below a majority. Once that occurs, the new invention allows for bringing the cluster together using the working nodes. The cluster itself will find the most up-to-date data.

Yet another related art method to which the method of the present invention generally relates is described in U.S. Pat. No. 6,163,855 entitled "Method And System For Replicated And Consistent Modifications In A Server Cluster". This prior art method is a method and system for communicating modification information to servers in a server cluster. Local changes, such as modifications to a resource requested at one node, are associated into a single transaction. A master node, such as the node that owns the set of resources corresponding to the modifications in the transaction requests permission from a locker node to replicate the transaction. When permission to replicate the transaction is received from the locker node, the master node replicates the transaction by requesting each node in the cluster, one node at a time, to commit the transaction. Any node that does not commit the transaction is removed from the cluster, ensuring consistency of the cluster. Failure conditions of any node or nodes are also handled in a manner that ensures consistency.

The present invention differs from this related art in that the cited related art only describes a system for ensuring that copies of the quorum on each node are kept up to date. The present invention builds on the cluster system similar to that described above. The present invention allows for the cluster to function even when it has less member nodes than it normally needs to run. The invention allows the cluster to return to normal operation when the number of available nodes returns to the expected level.

Yet another related art method to which the method of the present invention generally relates is described in U.S. Pat. No. 6,336,171 entitled "Resource Protection In A Cluster Environment". This prior art method is a method of protecting volumes of a mass storage device shared by a server cluster and includes the step of transferring from (i) a first file system of a first server of the server cluster to (ii) a first filter driver of the first server, (iii) a write request packet directed to a first volume of the mass storage device. Another step of the method includes determining at the first filter driver whether the first server has ownership of the first volume. Yet another step of the method includes transferring the write request packet from the first filter driver to a lower level driver for the mass storage device only if the determining step determines that the first server has ownership of the first volume. Apparatus for carrying out the method are also disclosed.

The present invention differs from this related art in that the cited related art only describes the methods used to operate a clustered environment. The method of the present invention utilizes an underlying cluster system to also provide this functionality. The method of the present invention also provides methods to have the cluster continue even if the number of nodes falls below a majority. Finally, the present invention also returns the cluster to normal operation once the number of nodes available increases to the correct level.

BRIEF SUMMARY OF THE INVENTION

An embodiment of the invention is the revival and reconstitution of majority node set clusters which solves the problem of one or more server nodes failing in a clustered system having multiple server nodes. Under these circumstances when faults occur in the cluster node, the present system will initiate (i) a Detection phase to determine what kind of clustering mechanism is deployed; (ii) a Revival phase to permit the user to manually restart the nodes in the cluster once the non-operational nodes are ready to rejoin the cluster; (iii) a Reconstitution phase, so that the Revival phase can be terminated and the newly-revised operational nodes can be re-introduced to the cluster. Once this occurs, the Cluster Service can now run once again as a "majority set" cluster.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative, in nature, and not as restrictive and what is intended to be protected by Letters Patent is set forth in the appended claims. The present invention will become apparent when taken in conjunction with the following description and attached drawings, wherein like characters indicate like parts, and which drawings form a part of this application.

Glossary Items:
1. Majority Node Set: A single quorum resource from an MSCS perspective. The majority node set resource takes care to ensure that the cluster configuration data stored on the majority node set is kept consistent across the different disks.
2. Cluster: In a computer system, a cluster is a group of servers and other resources that act like a single system and enable high availability and, in some cases, load balancing and parallel processing.
3. Quorum: A disk resource used to store information about the current cluster configuration.

4. Local Quorum: Quorum resource that stores quorum data locally on a node's disk drive. A local quorum is created automatically during cluster setup when no shared drives are detected. This resource cannot be failed over to another node. A multi-node cluster can be converted to a single node cluster with a local quorum for troubleshooting purposes.

5. Majority Node Sets Quorum: Quorum data is stored locally in a directory on each node of the cluster. The set of quorum resources will be seen by MSCS as a single quorum. Any changes made to a majority of the node's quorum data will be seen as an official change and will be treated as the most up to date copy. If a network outage severs the cluster into two, the remaining group with the majority of the nodes will continue to function while the other group would take its resources offline.

6. MSCS (Microsoft Cluster Service: MSCS refers to the Microsoft Cluster Server. This is software that supports the connection of two servers into a cluster for higher availability, easier manageability of data and application. It can automatically detect and recover from server or application failures, and can also move server workloads to a balanced utilization. A summary of this technology is shown in several Microsoft publications (a) "*Microsoft Cluster Server Administrator's Guide, Microsoft Windows NT Server, Enterprise Edition*, published by Microsoft Corporation 1997, Document No. X0345521; (b) *Microsoft Windows* 2000 *Server, Windows* 2000 *Clustering Technologies: Cluster Service Architecture White Paper*; published by Microsoft in 2000; (c) *Microsoft Windows* 2000 *Advanced Server Getting Started*, published by Microsoft Corporation, 1999, Part No. X05-12873." MSCS relies on the Windows™ network services for handling communication between nodes. Thus, little network overhead is required during normal operations. MSCS also relies on Windows security services to secure all node-to-node communication, including the forming of a cluster. Communication between the nodes of a cluster enables MSCS to detect the node failures, status changes, and to manage the cluster as a single entity. Nodes in a cluster communicate using their Cluster Services. The Cluster Service keeps track of the current state of the nodes within a cluster, and determines when a group and its resources should failover to an alternate node. This communication takes the form of messages that are sent regularly between the two nodes' Cluster Services, these messages being designated as "heartbeats".

7. Standard shared disk Quorum: Quorum data is stored on a shared disk connected to the nodes via HBA(s).

8. HBA (Host Bus Adapter): Network interface card that enables communication between systems.

9. Node: a computer system that is a member of a cluster.

10. Force Quorum: To force the surviving nodes of a cluster to continue operating as a cluster even though it has lost the quorum.

11. Reconstitute Cluster: To bring the nodes of cluster together so that they resume working as a fully functional clustered system, performing all operations normally associated with being clustered.

12. Revive Cluster: To bring a cluster online from an offline state.

13. Cluster Service: Software component that controls cluster operations and manages the cluster database.

14. Revival Code: Code needed to bring nodes to a state where they can function as a cluster even without all nodes being available.

15. Registry: Microsoft Windows storage area used to hold settings about the operation of a computer.

16. Cluster Membership: List of nodes that constitute the cluster and can perform the functions inherent with being clustered.

17. Shared disk: Any disk that is physically attached to multiple computers.

18. Split-brain: A scenario where all the network communication links between two or more cluster nodes fail. This will sever the cluster into two or more partitions. Each partition will think that it is the surviving partition and continue operating.

19. Total Node Count: This represents the number of nodes (servers) in the clustered system network.

20. Active Node Count: This represents the number of nodes (servers) that are fully operational at the time of the node count.

21. Shared Disk Quorum: A resource holding quorum information in a single location capable of being accessed by all member nodes of the cluster. At any one time, only one node may access the Quorum.

22. Cluster Verifier: This is a program which only operates against clusters using the Microsoft Cluster Service (MSCS). It compares the environmental configuration, state of communications and the shared storage used by the nodes within a cluster.

23. Heartbeat: In the Microsoft clustering system, the heartbeat is a message that is sent regularly by the Cluster Service on one node to the Cluster Service on the other node across a private network connection. This is part of the Microsoft Cluster Server technology. The disappearance of the heartbeat is assumed to imply a failure of the node.

24. Quorum Resource: This involves a resource that stores cluster management data, such as recovery logs for changes made to the cluster data. Generally, this must be a physical disk resource in the Microsoft Cluster Service system. Such recovery logs are often designated as "QUOLOG.LOG".

25. Clustering: This is a situation where there is a use of two or more systems that work together. Generally, it refers to multiple computer systems that are linked together in order to handle variable workloads or to provide continued operation in the event that one fails. As an example, a cluster of four computers each with four CPUs, would provide a total of 16 CPUs processing simultaneously available. A cluster of computer systems provides fault tolerance and load balancing. If one system fails, one or more additional systems are still available. Load balancing distributes the workload over multiple systems.

DETAILED DESCRIPTION

One embodiment of the invention involves a method for reviving and reconstituting majority node sets by:

(a) detecting whether the system has a majority node set, shared disk quorum, or local quorum;
(b) reviving majority node set clusters;
(c) maintaining a running total of the active node count;
(d) allowing user interaction when deciding to revive or not;
(e) reconstituting majority node set clusters;
(f) testing node response;

(g) notifying the user when the cluster is reconstituted.

Figure 4:
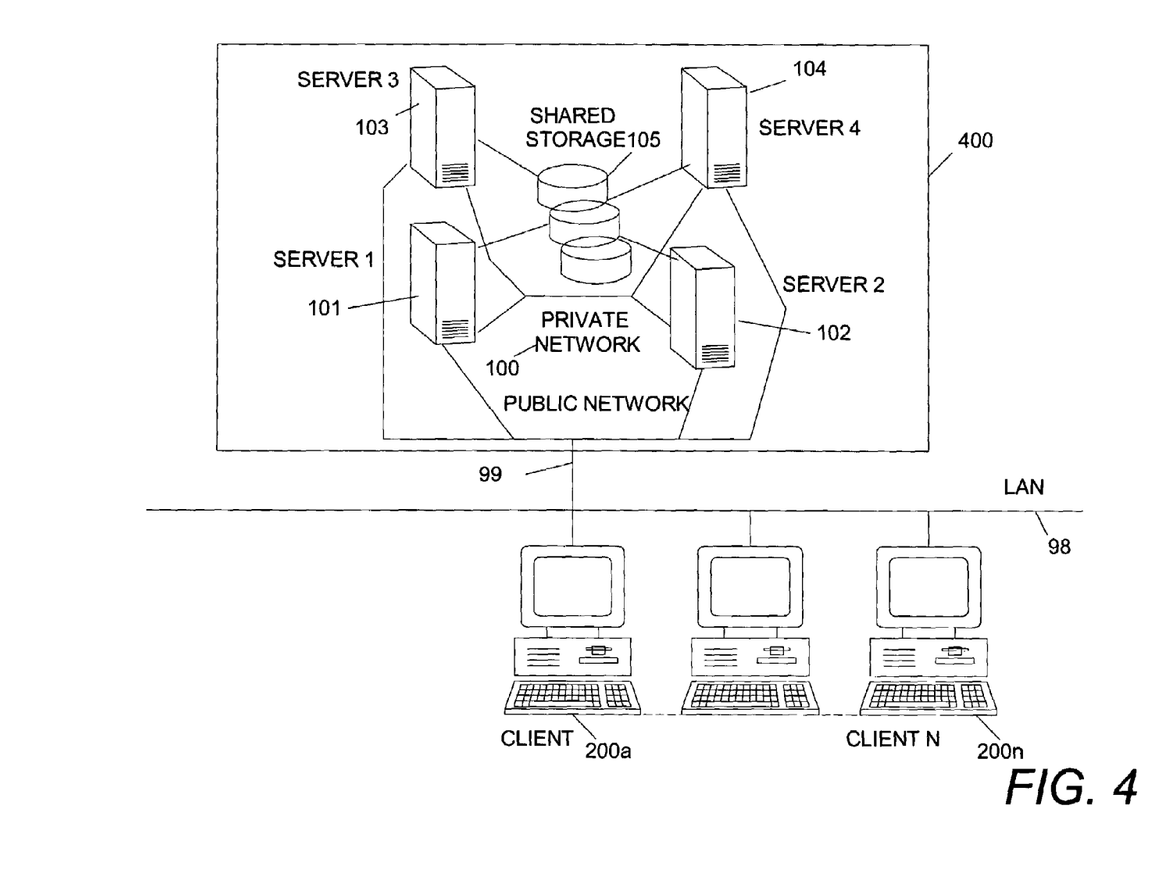
FIG. 4 is a component drawing showing the elements and modules, which utilize the software for the revival and reconstitution of majority set clusters.

FIG. 4 is a drawing illustrating the components involved in the method of reviving and reconstituting majority set clusters in a network of server nodes. Here, a series of User-Clients $200_a$ . . . $200_n$ situated on a LAN 98 are connected via public network 99 to a cluster of servers.

In FIG. 4, servers 101, 102, 103 and 104 are all interconnected to each other in addition to each server connected to a shared storage 105 via a private network, 100.

A "Majority Set Cluster" defines that at least 50% plus 1 server nodes are operative and available to the MSCS cluster network. For example, if the private network had 6 server nodes, then it would require at least 3(50%)+1=4 operative server nodes to continue operation of the cluster.

Figure 1:
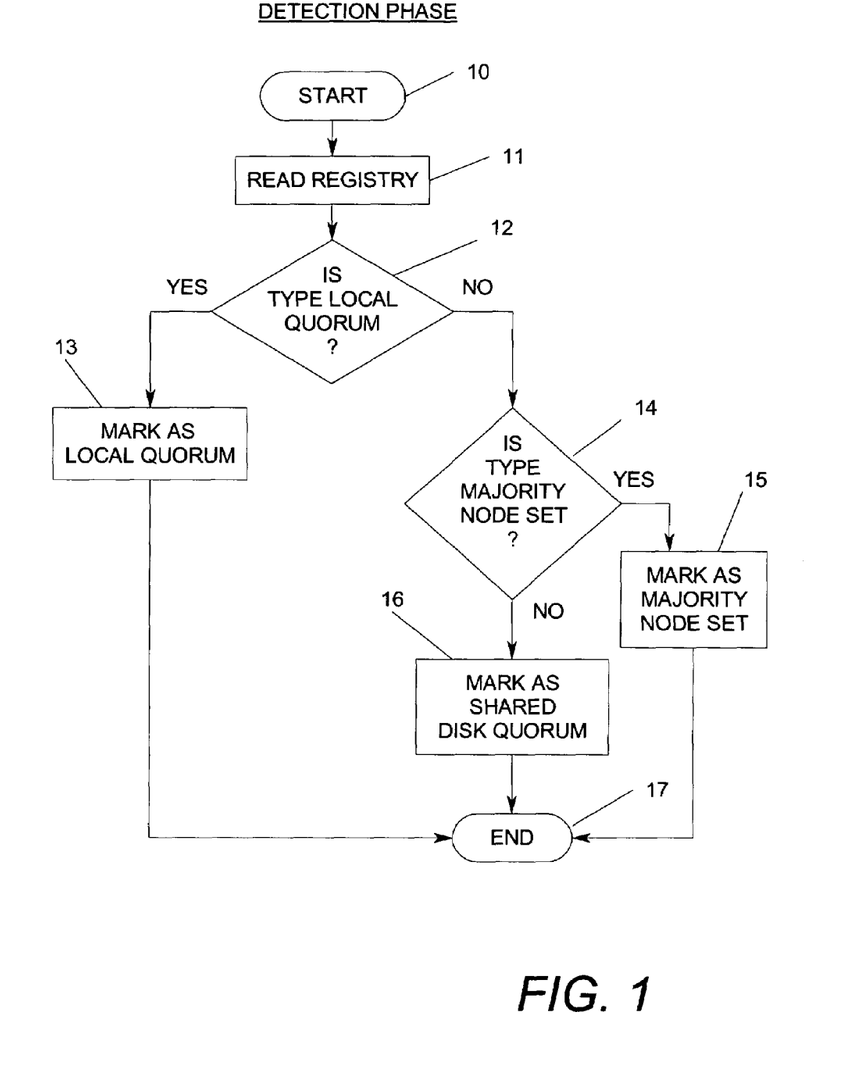
FIG. 1 is a detailed flowchart illustrating the detection phase.

FIG. 1 illustrates a flowchart of the modeling of the Detection phase. The Detection Phase operates to determine what kind of clustering mechanism is deployed and thus what kind of operation can be used. This phase begins with a start bubble 10, followed by a process block to read the registry (block 11). An inquiry is followed, which checks to see whether or not the type of quorum is a local quorum (Diamond 12). If the answer to inquiry 12 is "YES", it is marked as local quorum (block 13), and proceeds to exit the detection phase (bubble 17). If the answer to inquiry 12 is "NO", another inquiry is made as to whether or not the type is a majority node set (Diamond 14). If the answer to inquiry 14 is "YES", it is marked as a majority node set (block 15). If the answer to inquiry 14 is "NO", it is marked as a shared disk quorum (block 16). The detection phase then proceeds to exit (bubble 17).

The differences between a local quorum, a majority node set, and a shared disk quorum are as follows:

(a) in a local quorum, each node in the cluster has its own quorum;

(b) a majority node set does not need a shared disk for the quorum;

(c) and a shared disk quorum is a single quorum housed on a single shared resource.

The Detection Phase utilizes a Cluster Verifier. The Cluster Verifier is a product that compares the environmental configuration, communications, and shared storage used by nodes within a cluster.

The Verifier compares the environmental configuration from a node in the cluster in three ways. It compares the data against rules from Microsoft, against a previously saved version (which is assumed to have been working), and against the saved data from other nodes in the cluster.

The Verifier also tests the communications between nodes in the cluster, the communications between the node and the primary domain controller on the network (so that the node is active for outside communications), and the ability to use Remote Procedure Calls (RPC) to execute commands on a remote computer.

Lastly, the Verifier tests the storage capacity of nodes in the cluster to correctly utilize shared media for both data and the quorum information to run the cluster.

Figure 2A:
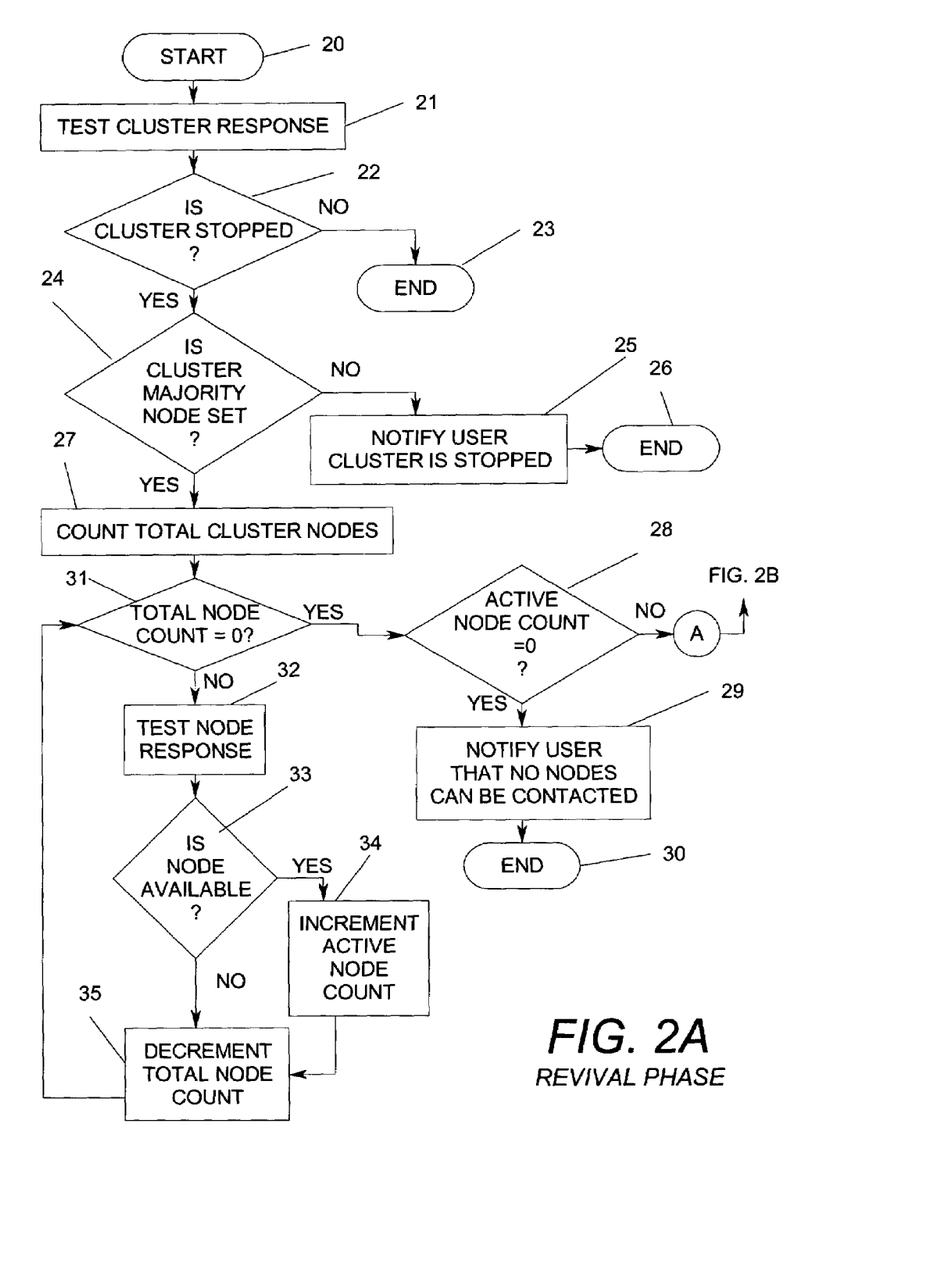
FIGS. 2A and 2B combined form a flowchart that describes the phase of revival.
Figure 2B:
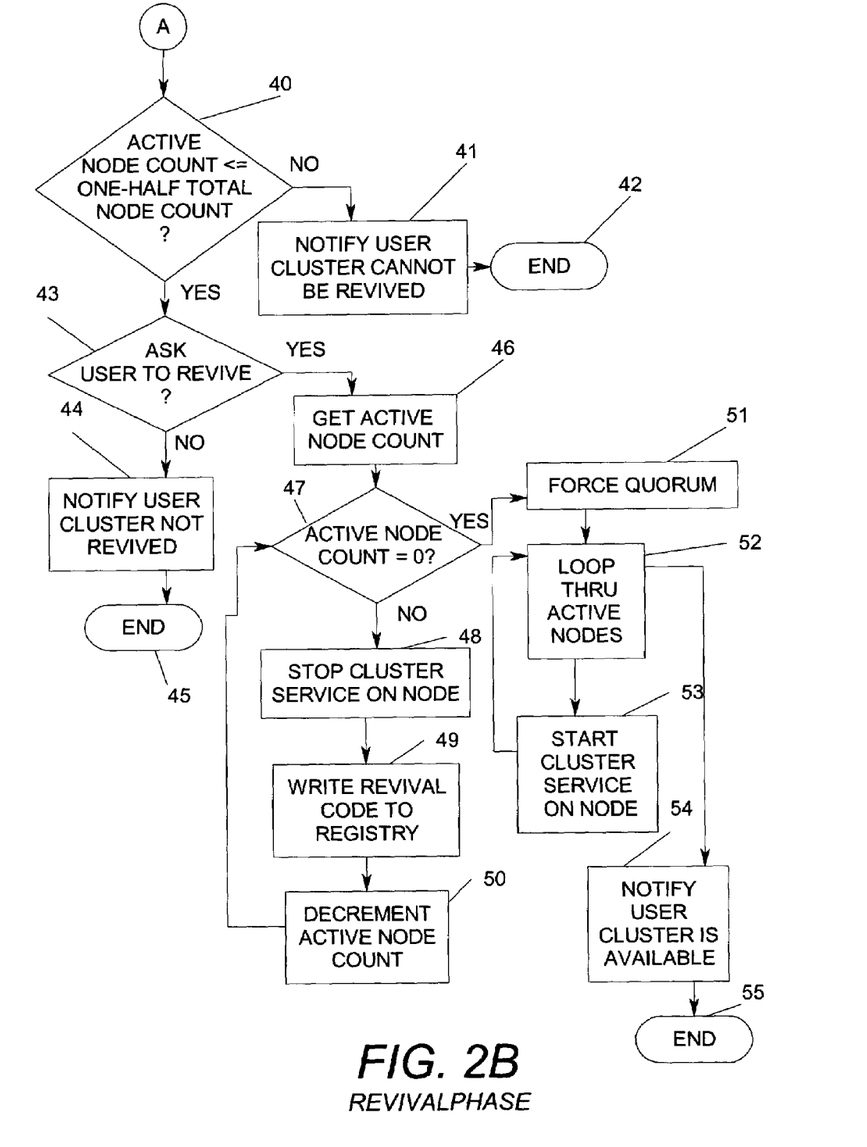

FIG. 2 is a flowchart detailing the high-level steps for the Revival phase. FIG. 2 is comprised of FIGS. 2A and 2B. The Revival phase occurs after sensing that the operational cluster nodes have fallen below 50%+1. This phase allows the user to manually restart the cluster after revival of the non-operational nodes.

With reference to FIG. 2A, a flowchart describing the steps taken to revive the majority node set clusters is shown. This begins with a start bubble 20, and proceeds to test cluster response (block 21). An inquiry is then made to check to see whether or not the cluster is stopped (Diamond 22). If the answer to inquiry 22 is "NO", the process ends (bubble 23).

If the answer to inquiry 22 is "YES", another inquiry is made as to whether or not it is a majority node set (Diamond 24). If the answer to inquiry 24 is "NO", the user is notified that the cluster is stopped (block 25), and then exits the revival phase (bubble 26). If the answer to inquiry 24 is "YES", the cluster majority node set loops through the cluster nodes (block 27) to count the total cluster nodes. Next, the node response is tested (block 31) with a query if the total node count=0? If the decision block 31 is a "NO", a test is performed to test node responsiveness (block 32) and then follows to another inquiry which checks to see if the node is available (Diamond 33). If the answer to inquiry 33 is "NO", the total node count is decremented (block 35), which then loops back to loop through a check as to Total Node Count, step 31. If the answer to inquiry 33 is "YES", the active node count is incremented (block 34), which then follows to decrement the total node count (block 35), and then proceeds again to loop through cluster nodes count, (block 31). The sequence goes back to loop through the cluster nodes (block 31), which if "YES", another inquiry is made to check to see if the "active" node count is zero (Diamond 28). If the answer to inquiry 28 is "NO", the process is continued in FIG. 2B. If the answer to inquiry 28 is "YES", the user is notified that no nodes can be contacted (block 29), which then ends the process (bubble 30).

With reference to FIG. 2B, which follows from FIG. 2A, the continuation of the Revival phase is shown. This begins with an inquiry step 40 to check if the "active" node counts are one-half or less of the total node count. If the answer to inquiry 40 is "NO", the user is notified that the cluster is not revivable because it has already enough nodes to function correctly (block 41), which then ends (bubble 42). If the cluster is not working, but a majority of the nodes are active, then there is something else wrong. If the answer to inquiry 40 is "YES", another inquiry is followed (Diamond 43) to ask the user if they want to revive. If the answer to inquiry 43 is "NO", the user is notified that the cluster is not revived (block 44), and then ends out of the process (block 45).

If the answer to inquiry 43 is "YES", the active nodes are then looped through (block 46) to get the active node count. If inquiry 47 checks for an Active Node Count=0? and finds "NO", then the cluster service on a node is stopped (block 48) and the revival code is written to the registry (block 49), which then decrements the active node count (block 50).

From there, the process returns to inquiry 47 to ask if active node count is equal to zero. If the answer to inquiry 47 is "YES", the quorum is forced (block 51). The sequence then loops through active nodes (block 52). Next, the cluster service on the node is started at (block 53), which then loops back to loop through active nodes (block 52). Once here, the user is notified that the cluster is now available (block 54), at which point it then exits the process of node set cluster revivals (bubble 55).

Figure 3A:
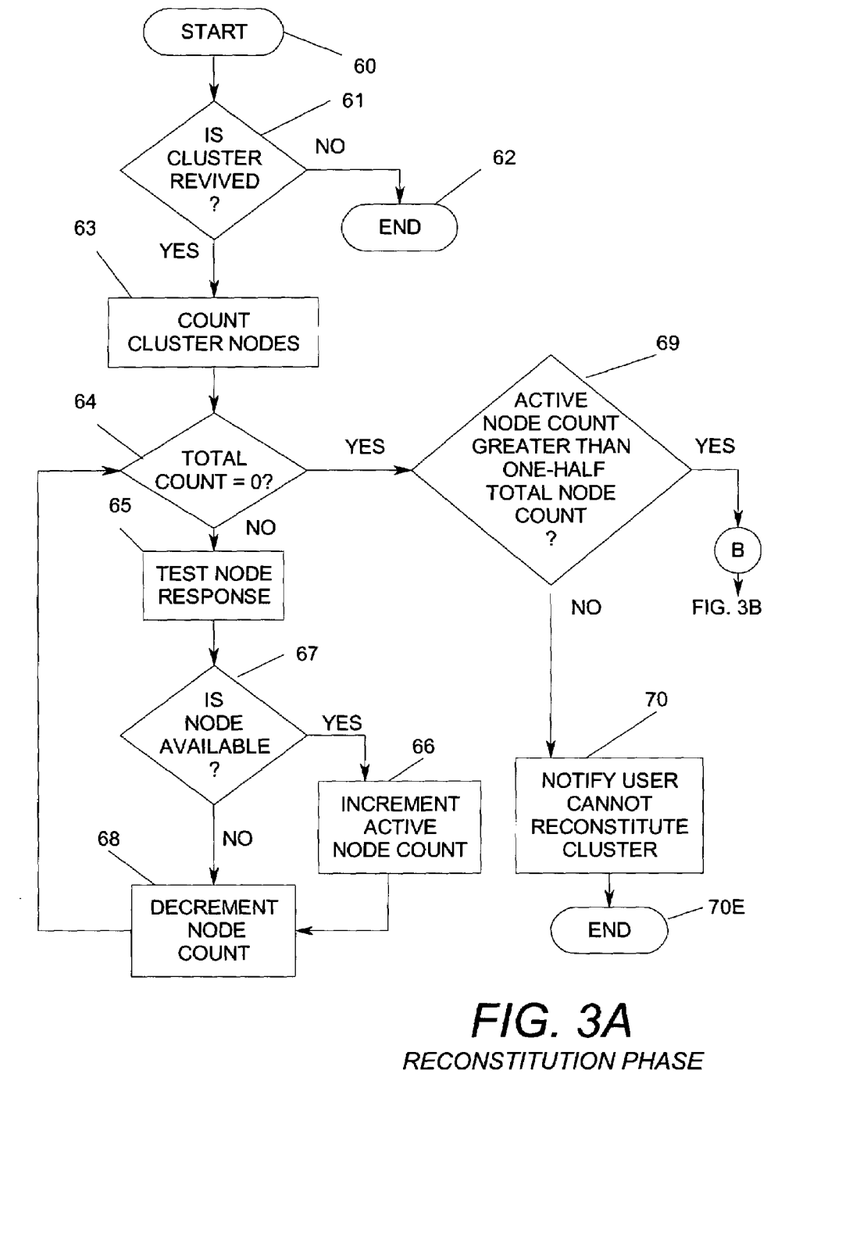
FIGS. 3A and 3B combined form a flowchart that describes the phase of reconstitution.
Figure 3B:
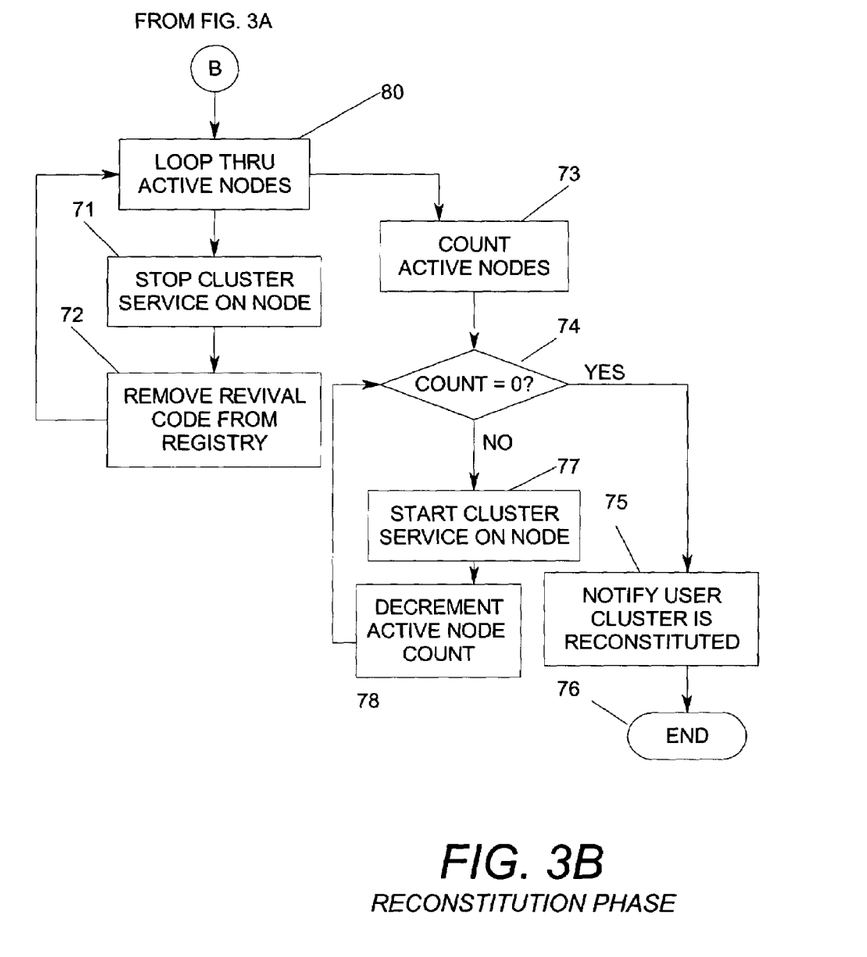

FIG. 3 is a flowchart detailing the high-level steps for the Reconstitution phase. FIG. 3 is comprised of FIGS. 3A and 3B.

FIG. 3A shows the first steps of the Reconstitution phase. This begins with a start bubble 60, which then proceeds to an inquiry 61 to check to see if the cluster is revived. In order for this cluster to be revived, the code from process 49 in FIG. 2B, must have been written to the registry on the node.

If the answer to inquiry 61 is "NO", the process quickly exits (bubble 62). If the answer to inquiry 61 is "YES", the cluster nodes are counted and looped through (block 63) to count the number of cluster nodes. At step 64, a query is asked—is the total count=0? If the response is "NO" then step 65 will test the node response to where step 67 asks—is the node available? If "YES" is the reply, then step 66 increments the active node count after which step 68 decrements the node count and returns to step 64. If "NO" is the reply at step 67, and the node is not available, the node count is decremented (block 68), and returns to check if the total count is equal to zero (block 64).

At step 64, if the query on total count=0? is "YES", then step 69 queries if the active node count is greater than one-half the total node count. This would indicate a majority of nodes. If the answer at step 69 is "YES", this then moves to step 80 in FIG. 3B.

At step 80, FIG. 3B, the sequence will loop through the active nodes where at step 71 there will be a STOP of cluster service on the active nodes. Then at step 72, the Revival code will be removed from the registry and the sequence returns to step 80.

Now step 80 moves to step 73 to count the active nodes after which a decision block 74 queries—is the count=0? IF "YES", then step 75 will notify the user that the cluster is reconstituted, and the program exits at end bubble 76. If step 74 is "NO", then step 77 will start cluster service on a node after which step 78 will decrement the node count and return to step 73.

Now returning to FIG. 3A, step 69, "NO"; if the node count is less than one-half total node count, the node count is not a majority and step 70 operates to notify the user that the cluster cannot be reconstituted and exits at end bubble 70E.

Described herein is a system and method whereby, when a fully operating cluster having multiple server nodes incurs a failure of one or more nodes, it is then necessary to re-establish an operating system cluster with a "majority node set" which includes 50% plus 1 of the available operating nodes. If 50% plus 1 operating nodes cannot be effectuated, the user is notified that the cluster is inoperative. However, the cluster can be reconstituted via a Detection, Revival and Reconstitution phase, which will pick-up enough operational nodes to constitute a majority node set.

While one embodiment of the invention has been described herein, there may be other variations which may still be encompassed by the claims attached hereunto.

What is claimed is:

1. A system where a cluster of servers constitute a multiplicity of cluster nodes which are all connected to each other to service multiple PC users via a public network comprising:
   (a) shared storage means virtually providing a disk resource (Quorum) of stored data, said means being seen as a single quorum repository of a Microsoft Cluster Service Program;
   (b) local quorum disk resource means which are positioned in each node of said cluster of servers and which operate as a single quorum;
   (c) means to automatically synchronize the remaining nodes of the cluster when a node is disconnected or inoperative including:
      (c1) means to reorganize said cluster nodes when the operable node count falls below 50% of the total node count;
   (d) means to convert said multiplicity of cluster nodes into a single node with its own local quorum disk resource including:
      (d1) means to sense a network outage which severs said cluster into two partitions;
      (d2) means to enable the remaining group holding the majority of nodes to continue in operable activity;
      (d3) means to automatically take off-line the non-majority group of nodes;
   (e) means to troubleshoot said single node to find the cause of its inoperability, said means including:
      (e1) means to test the activation signal common to each mode;
      (e2) means to test the storage capability of each node;
      (e3) means to test the remote processing capability of each node.

2. A cluster system of "M" server nodes operating with an (MSCS) Microsoft Cluster Service program and able to revive and reconstitute a majority node set cluster after a node failure comprising:
   (a) a majority node set quorum resource servicing said server nodes when a majority of the cluster nodes are operating and are all in communication with each other;
   (b) means to automatically bring back the cluster on-line after a failure causing non-utilization of one or more nodes said means including:
      (b1) means to detect whether the system is operating as a majority node set, a shared disk quorum or as a local quorum, including:
         (b1a) means to revive and put back online non-functioning server nodes;
         (b1b) means to reconstitute sufficient server nodes to establish a majority node set cluster, including:
            (b1ba) means for establishing an operating cluster where M/2+1 is the number of operational server nodes.

3. In a cluster system of "M" server nodes operating with an (MSCS) Microsoft Cluster Service Program, a method for reviving and reconstituting a majority node set cluster after a node failure comprising the steps of:
   (a) executing a detection phase wherein a Cluster Verifier determines the type of clustering mechanism being deployed;
   (b) instituting a Revival Phase, when the operating cluster nodes fall below M/2+1, in order to allow a user to manually restart the cluster;
   (c) instituting an automatic Reconstitution Phase, when the prior non-operating cluster nodes are operational and ready to rejoin said cluster including the steps of:
      (c1) terminating said Revival phase; and
      (c2) reconnecting said newly restored operational nodes back into said cluster.

* * * * *